(12) United States Patent
Kurokawa et al.

(10) Patent No.: US 9,551,834 B2
(45) Date of Patent: Jan. 24, 2017

(54) METHOD TO ASSEMBLE TRANSMITTER OPTICAL SUBASSEMBLY

(71) Applicant: Sumitomo Electric Industries, Ltd., Osaka-shi (JP)

(72) Inventors: Munetaka Kurokawa, Yokohama (JP); Tomoya Saeki, Yokohama (JP); Yasushi Fujimura, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 234 days.

(21) Appl. No.: 14/170,288

(22) Filed: Jan. 31, 2014

(65) Prior Publication Data
US 2014/0215816 A1 Aug. 7, 2014

(30) Foreign Application Priority Data
Feb. 4, 2013 (JP) ................................. 2013-019411

(51) Int. Cl.
*G02B 6/32* (2006.01)
*G02B 6/42* (2006.01)

(52) U.S. Cl.
CPC ............... *G02B 6/32* (2013.01); *G02B 6/4204* (2013.01); *G02B 6/4225* (2013.01);
(Continued)

(58) Field of Classification Search
CPC ............ G02B 6/12004; G02B 6/12021; G02B 6/1203; G02B 6/32; G02B 6/4204; G02B 6/4215; G02B 6/4225; G02B 6/4227; G02B 6/4286; Y10T 29/4913
See application file for complete search history.

(56) References Cited

U.S. PATENT DOCUMENTS 5,113,404 A * 5/1992 Gaebe ................ G02B 6/12004
257/712
5,253,313 A 10/1993 Kishima
(Continued)

FOREIGN PATENT DOCUMENTS

EP 0631164 A1 12/1994
JP 01-101511 A 4/1989
(Continued)

OTHER PUBLICATIONS

Notification of the First Office Action in Chinese Patent Application No. 201410045287.X, dated Jul. 14, 2016.
(Continued)

*Primary Examiner* — Carl Arbes
(74) *Attorney, Agent, or Firm* — Venable LLP; Michael A. Sartori; Trent B. Ostler

(57) ABSTRACT

A method to assemble a transmitter optical module is disclosed, where the optical module installs two lenses, one of which concentrates an optical beam emitted from a laser diode, while, the other collimates the optical beam concentrated by the former lens. The method has a feature that the first lens is firstly positioned in a point to collimate the optical beam coming from the laser diode, then, moved to a point, which is apart from the former point with respect to the laser diode, to concentrate the optical beam. The process performs the steps to position the lens by a jig to extract the optical beam passing through the first lens outside of the housing.

14 Claims, 10 Drawing Sheets

(52) U.S. Cl.
CPC .......... *G02B 6/4227* (2013.01); *G02B 6/4215* (2013.01); *G02B 6/4286* (2013.01); *Y10T 29/4913* (2015.01)

(56) References Cited

U.S. PATENT DOCUMENTS

| | | |
|---|---|---|
| 8,036,533 B2 | 10/2011 | Hosomi et al. |
| 2005/0025420 A1 | 2/2005 | Farr |
| 2006/0209297 A1 | 9/2006 | Biet et al. |
| 2006/0239317 A1 | 10/2006 | Yoshida et al. |

FOREIGN PATENT DOCUMENTS

| | | |
|---|---|---|
| JP | H11-097800 A | 4/1999 |
| JP | 2003-168838 A | 6/2003 |
| JP | 2009-105106 A | 5/2009 |

OTHER PUBLICATIONS

Notice of Reasons for Rejection in counterpart Japanese Patent Application No. 2013-019411, dated Sep. 6, 2016.

\* cited by examiner

METHOD TO ASSEMBLE TRANSMITTER OPTICAL SUBASSEMBLY

BACKGROUND

1. Technical Field

The present application relates to a method to assemble a transmitter optical sub-assembly (hereafter denoted as TOSA), in particular, the application relates to a TOSA having a function of the wavelength division multiplexing (hereafter denoted as WDM).

2. Prior Arts

Various TOSAs implemented with the WON function have been disclosed. For instance, U.S. Pat. No. 8,036,533B, has disclosed a TOSA with optical sources, arrayed lenses, and an optical multiplexer where they are enclosed within a package. Optical beams coming from respective optical sources are collimated by arrayed lenses, enter the optical multiplexer by an inclined angle, iterate internal reflection within the optical multiplexer as being multiplexed with other optical beams, and are output as a single multiplexed beam. The inclined angle of the optical multiplexer and the thickness thereof determine the axes of the optical beams.

A Japanese Patent Application laid open No. H01-101511A has disclosed an optical system for multiplexing optical beams each output from a laser diode (hereafter dentoed as LD) and collimated by a collimating lens. The collimated beams enter a concentrating lens but at points different from others. The concentrating lens concentrates thus entered collimated beams on a point.

As a volume of information to be transmitted drastically increases, a new type of an optical transceiver widely called as Centum Form factor Pluggable (hereafter denoted as CFP) has been developed. However, there is no end to request further increase of the transmission capacity by limited power consumption. An optical transceiver with smaller sized and reduced power consumption compared with CFP is eagerly requested in the field. Such an optical transceiver generally needs an enhanced coupling efficiency between an external optical fiber and an optical signal source. The optical systems those disclosed in prior arts described above do not always satisfy the requests.

SUMMARY OF THE INVENTION

One embodiment of the present application relates to a method to assemble a transmitter optical module that includes steps of: preparing an intermediate assembly including a semiconductor laser diode (hereafter denoted as LD), a substrate for mounting the LD, and a housing for installing the substrate with the LD; extracting an optical beam output from the LD to an outside of the housing by using a supplementary jig to offset the optical beam; aligning a first lens, as monitoring the optical beam, in a position where the optical axis of the first lens coincides with that of the LD and the optical beam passing through the first lens becomes a collimated beam; and moving the first lens, as monitoring the optical beam passing through the first lens, in another position where the LD is positioned in a focal point of the first lens.

The supplementary jig may include two prisms each reflecting the optical beam output from the LD to offset the optical axis of the optical beam, the optical bean output from the supplementary jig being substantially in parallel to the optical axis of the optical beam output from the LD.

The step to align the first lens includes a step to monitor the optical beam output from the supplementary jig two-dimensionally. Specifically, the first lens may be aligned such that a position corresponding to the maximum intensity becomes the center of the two-dimensional image, and this two-dimensional image has a predetermined size.

The step to move the first lens includes a step to move the first lens so as to be apart from the LD by a predetermined length as keeping the maximum intensity to be in the center of the two-dimensional image.

The method may include, after moving the first lens, a step to fix the first lens by steps of: lifting the first lens from the substrate slightly, applying an adhesive resin on the substrate beneath the lifted first lens; landing the first lens on the substrate; and curing the adhesive resin by irradiating the resin with ultraviolet rays and/or heating the resin.

BRIEF DESCRIPTION OF DRAWINGS

The foregoing and other purposes, aspects and advantages will be better understood from the following detailed description of a preferred embodiment of the invention with reference to the drawings, in which.

DESCRIPTION OF EMBODIMENTS

Next, some embodiments will be described as referring to drawings. In the description of the drawings, numerals or symbols same or similar to each other will refer to elements same or similar to each other without duplicate explanations. Also, in the figures, symbols, $P_1$ to $P_7$, denote reference planes each disposed in this order.

Figure 1:
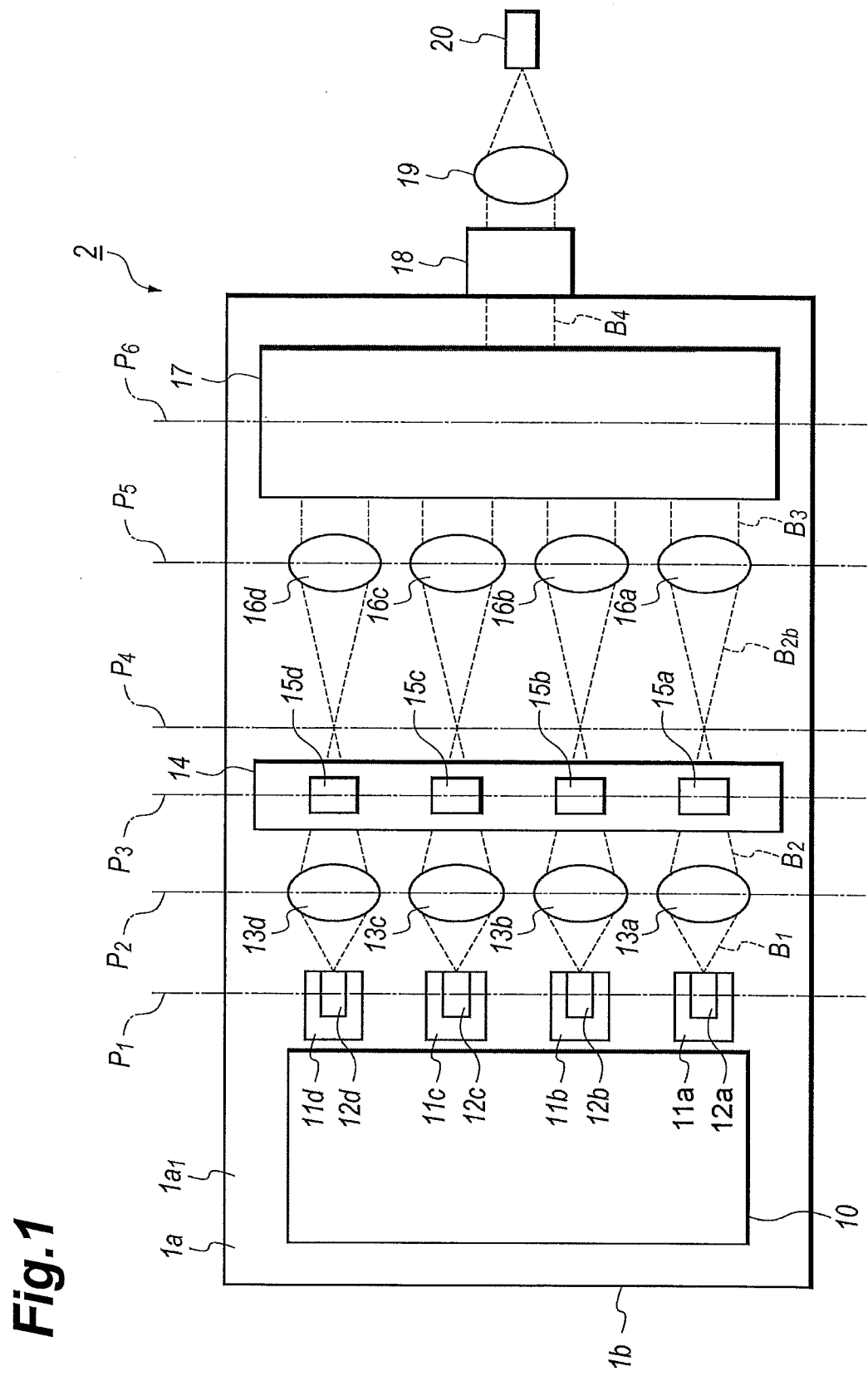
FIG. 1 is a plan view of a transmitter optical module according to one embodiment.

A transmitter optical module of an embodiment will be described as referring to FIGS. 1 and 2. The transmitter optical module 2 includes a driver 10, sub-mounts, 11a to 11d, semiconductor laser diodes (LDs), 12a to 12d, first lenses, 13a to 13d, a beam splitter 14, monitor photodiodes (mPDs), 15a to 15d, second lenses, 16a to 16d, and an optical multiplexer 17. The first lenses, 13a to 13d, are a type of concentrating lens; while, the second lenses, 16a to 16d, are a type of collimating lens. The transmitter optical module 2 further includes a substrate 1a, a housing 1b and an output port 18, where the substrate 1a mounts those electrical and optical elements described above; while, the housing 1b provides an output port 18 in one side thereof; and encloses those elements and the substrate 1a therein. The output port 18 provides a bore continuous from an opening provided in one side of the housing 1b. The bore of the output port 18 has a center substantially aligned with the center of the opening of the housing 1b.

The substrate 1a provides a surface $1a_1$ for mounting the electrical and optical components above described thereon. The LDs, 12a to 12d, which have a structure same with each other in the present embodiment, are disposed along the first reference plane $P_1$ on the primary surface $1a_1$ of the substrate 1a through respective sub-mounts, 11a to 11d. The LDs, 12a to 12d, each emits an optical beam $B_1$ with a specific wavelength different from others.

The first lenses, 13a to 13d, which have a configuration same with others, are arranged along the second reference place $P_2$ on the primary surface $1a_1$ of the substrate 1a by adhesive resin $J_1$. The second reference place $P_2$ is in parallel with the first reference plane $P_1$. Each of the first lenses, 13a to 13d, concentrates the optical beam $B_1$ coming from respective LDs, 12a to 12d, on the fourth reference plane $P_4$ that is also in parallel to the first and second reference planes, $P_1$ and $P_2$. The beam splitter 14, which is set between the second and fourth reference planes, $P_2$ and $P_4$, divides the optical beams $B_2$ output from the first lenses, 13a to 13d, into two parts, one of which $B_{2b}$ heads for the second lenses, 16a to 16d, transmitting through the beam splitter 14; while, rest portions advance toward the mPDs, 15a to 15d, each mounted on the beam splitter 14. When the LDs, 12a to 12d, are set on the first reference plane $P_1$ and the first lenses, 13a to 13d, are set on the second reference plane $P_2$, the optical beams $B_2$ output from the first lenses, 13a to 13d, and partially reflected by the beam splitter 14 focus on the primary surface of respective mPDs, 15a to 15d, as the optical beams $B_{2a}$.

Figure 2:
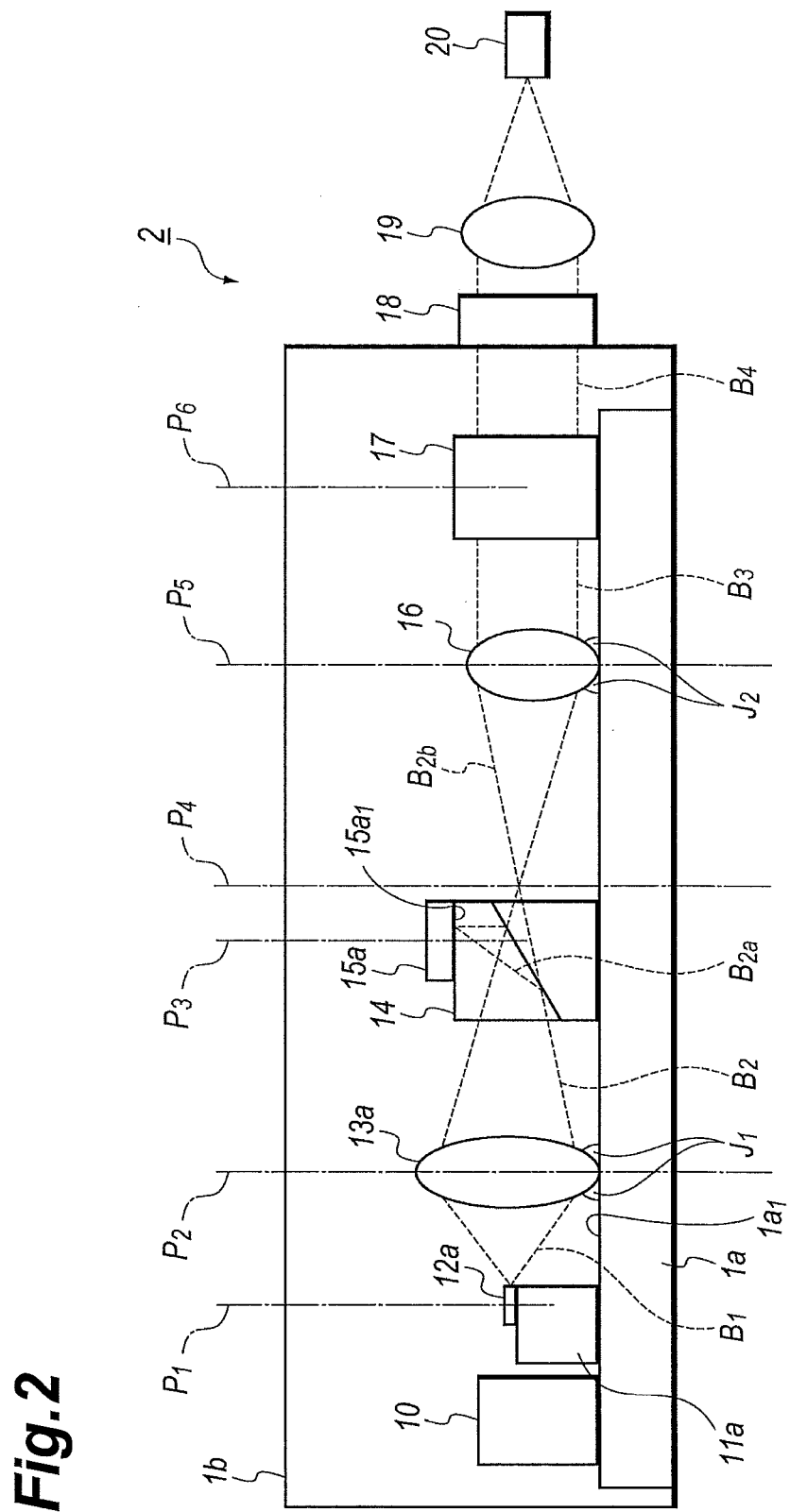
FIG. 2 is a side view of the transmitter optical module shown in FIG. 1.

The mPDs, 15a to 15d, are disposed along the third reference plane $P_3$, but the beam splitter 14 in a lateral center thereof is offset from the third reference plane $P_3$, that is, referring to FIG. 2, the interface between two prisms of the beam splitter 14 has an angle smaller than 45° with respect to the primary surface $1a_1$ of the substrate 1a. Thus, the optical beams $B_{2a}$ enter respective mPDs, 15a to 15d, by an inclined angle deviating from the normal of the mPDs, 15a to 15d. This optical arrangement of the mPDs, 15a to 15d, and the beam splitter 14 prevents light reflected at the surface of the mPDs, 15a to 15d, from returning to the LDs, 12a to 12d, and entering therein. Re-entered light in an LD causes optical noises in the LD. In the present embodiment, the mPDs, 15a to 15d, each has a structure same with others, and may have the type of, what is called, the top illumination or the back illumination.

The second lenses, 16a to 16d, are the type of the collimating lens. The second lenses, 16a to 16d, are positioned along the fifth reference plane $P_5$ on the primary surface $1a_1$ of the substrate 1a also by adhesive resin $J_2$. The fifth reference plane $P_5$ is in parallel to the first to fourth reference planes, $P_1$ to $P_4$. The second lenses, 16a to 16d, each converts the optical beam $B_{2b}$ output from the beam splitter 14 and focused on the fourth reference plane $P_4$ into collimated beams $B_3$.

The optical multiplexer 17 multiplexes the optical beams $B_3$ each output from respective second lenses, 16a to 16d, depending on wavelengths thereof and outputs a single optical beam $B_4$ toward the output port 18. The single optical beam $B_4$ is a collimated optical beam and contains four wavelengths. The third lens 19 put outside of the housing 1b concentrates the optical beam $B_4$ output from the optical multiplexer 17 and passing the output port 17 on an end of an external optical fiber 20.

Next, a process to assemble the transmitter optical module 2 will be described as referring to FIGS. 3 to 10. The description concentrates on a process to assemble one of first lenses 13a and one of second lenses 16a; but a technique substantially same with those described will be applicable to other of the first lenses, 13b to 13d, and other of the second lenses, 16b to 16d.

Figure 3:
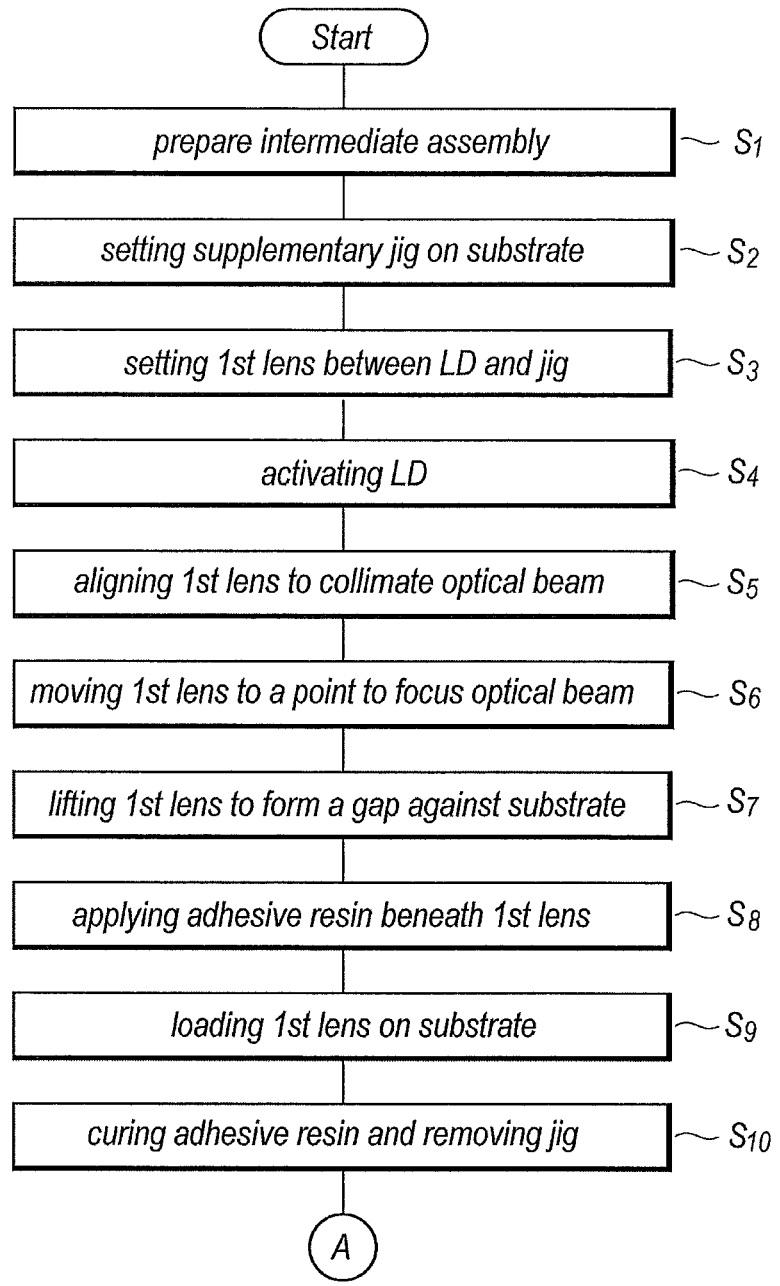
FIG. 3 is a flow chart of a process to assembly the transmitter optical module shown in FIG. 1.
Figure 4:
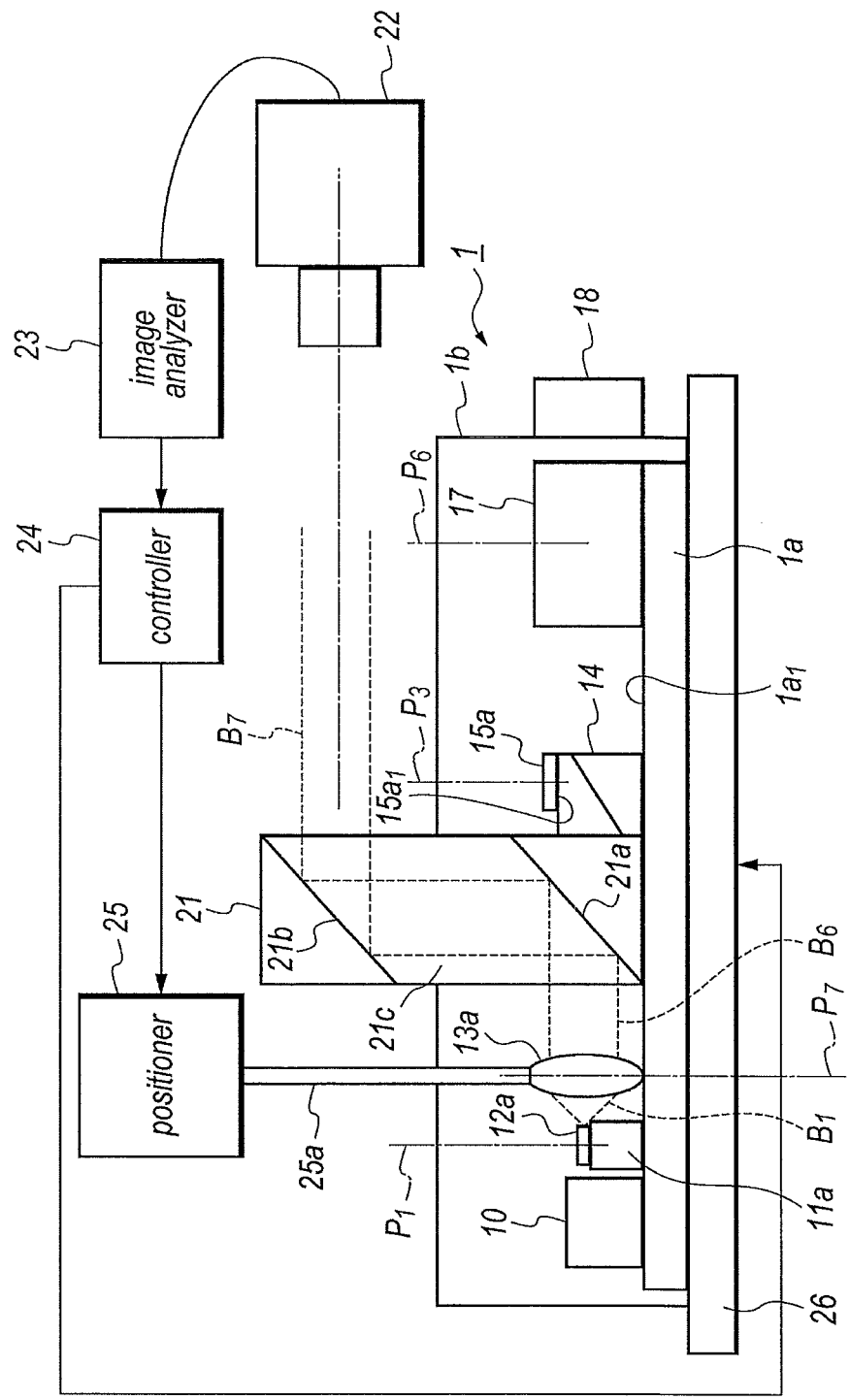
FIG. 4 schematically shows a process to assemble the first lens installed in the transmitter optical module.

Referring to FIG. 3, the process first prepares at step $S_1$ an intermediate assembly 1 that includes the substrate 1a, the LDs, 12a to 12d, the beam splitter 14, the mPDs, 15a to 15d, and the optical multiplexer 17, where the latter four components, 12a to 17, are precisely set in respective positions on the substrate 1a, and the substrate 1a thus assembling the components, 12a to 17, is set on the designed position within the housing 1b in advance. The intermediate assembly 1 thus processed is set on a laterally movable stage 26 as illustrated in FIG. 4.

The first lens 13a is assembled with the intermediate assembly 1 in subsequent steps, $S_2$ to $S_{10}$. Specifically, at step $S_2$, a supplementary jig 21 is set between the LD 12a and the beam splitter 14, or between the beam splitter 14 and the optical multiplexer 17. The supplementary jig 21 assembles two prisms, 21a and 21b, with a parallelepiped body 21c, where each of the oblique edge of the prisms, 21a and 21b, faces the other as a reflecting mirror. The optical beam $B_1$ output from the LD 12a and passing through the first lens 13a is able to be extracted from the housing 1b as the optical beam $B_7$ by the duplicate reflection at respective interfaces, 21a and 21b, of the supplementary jig 21.

Step $S_3$ of the process temporarily adjusts the position of the first lens 13a set between the supplementary jig 21 and the first LD 21a by using the lens holder 25a supported by the positioner 25. The lens holder 25a is a type of, for instance, the vacuum collet generally used in a semiconductor process, and/or the mechanical chuck. The positioner 25, or the lens holder 25a, moves the first lens 13a in up and down directions, and sometimes rotatively moves the first lens 13a around the axis of the lens holder 25a. At step $S_4$, the LD 12a is practically activated to emit the optical beam $B_1$.

At step $S_5$, the first lens 12a is practically aligned on the seventh reference plane $P_7$ as observing an image of the optical beam $B_7$ output from the supplementary jig 21 and detected by the image detector 22. When the relative distance between the first LD 12a, exactly, the front facet thereof, and the first lens 13a becomes the focal length of the first lens 13a, the optical beam $B_1$ output from the LD 12a is converted into a collimated or a parallel beam $B_6$, which is never focused on a point. The position of the first lens 13a where the optical beam $B_6$ becomes the parallel beam is assumed to be the seventh reference plane $P_7$.

Figure 5:
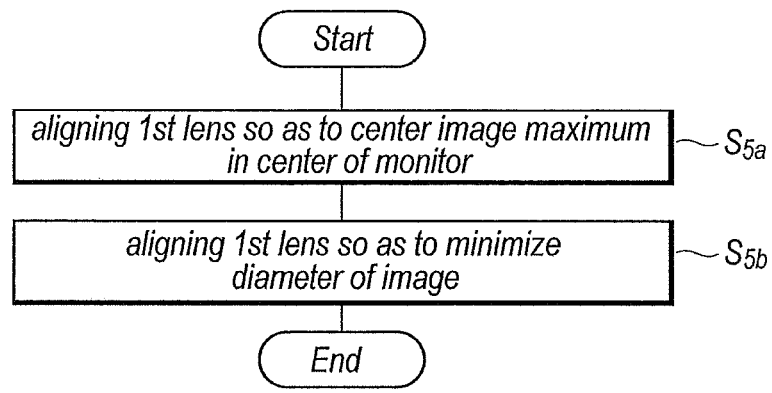
FIG. 5 is a flow chart of the process to assemble the first lens.
Figure 6:
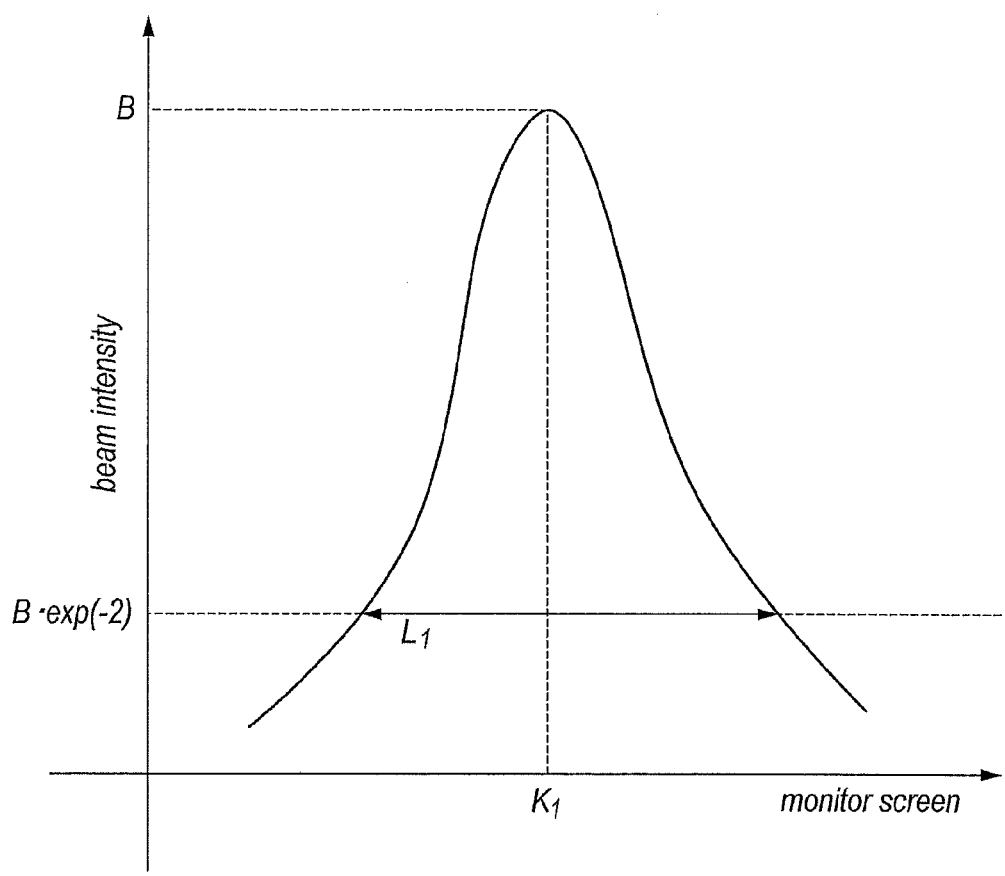
FIG. 6 schematically shows an intensity profile of an optical bema detected in the arrangement shown in FIG. 4.

Step $S_5$ is further specifically described as referring to FIGS. 4 to 6. Step $S_5$ includes two sub-steps, $S_{5a}$ and $S_{5b}$, indicated in FIG. 5. The controller 24, cooperating with the image analyzer 23 and the positioner 25, adjusts the position of the first lens 13a through the positioner 25 such that, as detecting the intensity of the image two-dimensionally by the image detector 23, the maximum $K_1$ becomes the center of the monitor of the image detector 23 as keeping the axial symmetry of the image. The peak position $K_1$ of the intensity of the optical beam $B_7$ is calculated by the image analyzer 23. When the position of the first lens 13a in the optical axis thereof deviates from the axis of the LD 12a, the image is deformed from the axial symmetry.

At step $S_{5b}$, the controller 24 further adjusts the position of the first lens 13a through the positioner 25 such that the diameter $L_1$ of the image of the optical beam $B_7$ becomes minimum, which substantially corresponds to a relative intensity of $1/e^2$ with respect to the maximum intensity B.

Although the intensity profile of the optical beam $B_7$ strongly depends on the far field pattern of the LD 12a, the minimum diameter or the minimum profile may be estimated. Thus, the image analyzer 23, based on the image of the optical beam $B_7$ detected two-dimensionally by the image detector 22, may evaluate the maximum intensity of the image and the size thereof. The position of the first lens 13a thus decided is exactly aligned with the LD 12a and just on the seventh reference plane $P_7$.

The controller 24, co-operating with the image analyzer 25, controls the positioner 25 and the movable stage 26. For instance, the positioner 25 may move the first lens 13a in up and down directions, while, the movable stage 26 may move the LD 12a laterally. The image detector 22 is fixed in a relative position with respect to the positioner 25. That is, the image detector 22 is movable in connection with the positioner 25.

Figure 7:
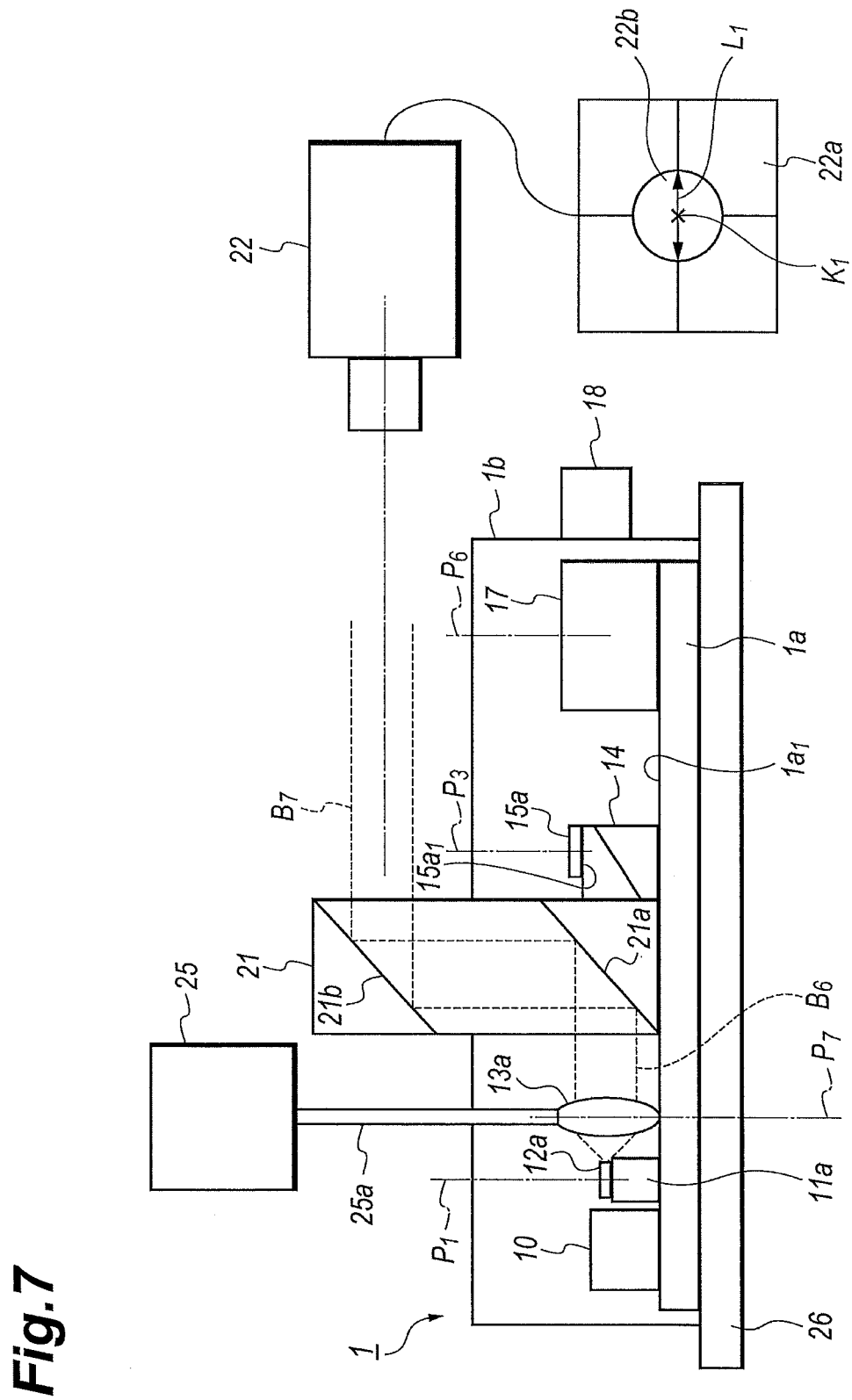
FIG. 7 schematically shows a process modified from those shown in FIG. 4.
Figure 8:
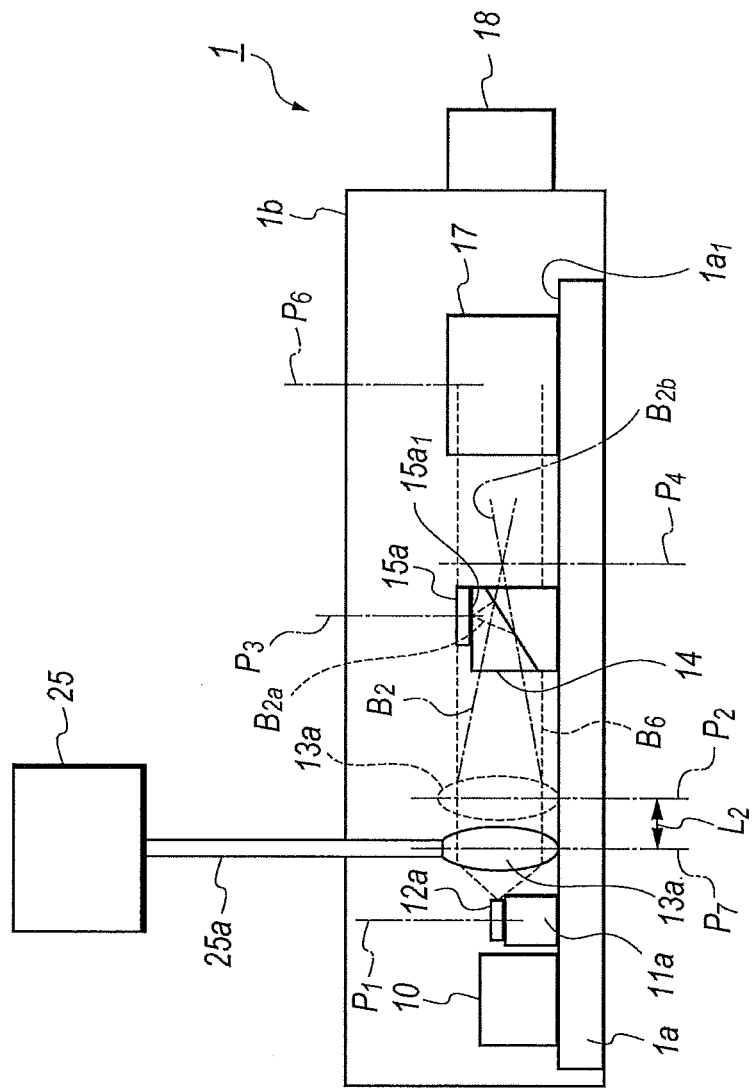
FIG. 8 schematically shows a process subsequent to those shown in FIG. 4 to position the first lens.
Figure 9:
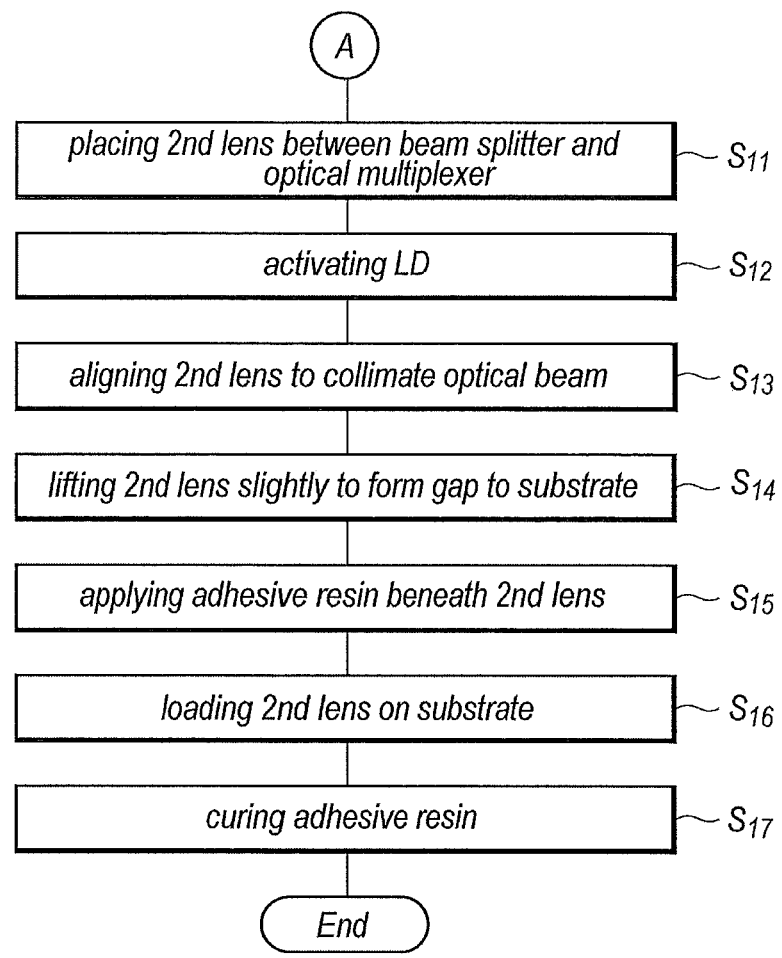
FIG. 9 shows a flow chart of a process subsequent to those shown in FIG. 5, where the process assembles the second lens.

Although step $S_5$ above described uses the image analyzer 23 and the controller 24; the positioning of the first lens 13a on the seventh reference plane $P_7$ may be carried out without these devices. As illustrated in FIG. 7, the output of the image detector 22 is brought to the visual monitor 22a that indicates the profile of the optical beam $B_7$ two-dimensionally by light and shade patterns. Accordingly, the positioner 25, namely the first lens 13a, and the movable stage 26, namely, the LD 12a, may be manually positioned such that the peak $K_1$ and the size $L_1$ of the light and shade pattern become respective designed conditions.

Step $S_6$ further moves the first lens 13a from the position on the seventh reference plane $P_7$ to the designed position on the second reference plane $P_2$ apart by a distance $L_2$ along the optical axis. Specifically, as monitoring the image profile of the optical beam $B_7$ through the supplementary jig 21, the first lens 13a is gradually apart from the LD 12a. As the positioner 25 or the movable stage 26 increases a distance between the first lens 13a and the LD 12a, the image monitored by the image detector 22 becomes clear and sharp. However, the optical axis of the first lens 13a is kept aligned with that of the LD 12a by keeping the center of the image and the shape of the clearer image.

Steps $S_7$ to $S_{10}$ fix the first lens on the designed position on the second reference plane $P_2$. First, the positioner 25 or the movable stage 26 slightly lifts up the first lens 13a to form a gap against the substrate 1a. Then, an adhesive resin is applied on the surface $1a_1$ at step $S_8$. The adhesive resin is a type of ultraviolet curable resin and/or thermo-curable resin. At step $S_9$, the positioner 25 or the movable stage 26 loads the first lens 13a down to the substrate 1a. Finally, the adhesive resin applied at step $S_8$ is cured by illuminating with ultraviolet rays or heating up to cure the adhesive resin to fix the first lens 13a rigidly and permanently on the second reference plane $P_2$ on the substrate 1a at step $S_{10}$. Then, the second lens 16a will be positioned. The supplementary jig 21 is removed after the first lens 13a is fixed on the substrate 1a.

Because the first lens 13a is precisely aligned along the second reference plane $P_2$ as described above, the mPD 15a may be also precisely positioned on the third reference plane $P_3$. When the first lens 13a is positioned on the second reference plane $P_2$, the focal point of the first lens 13a is set on the light receiving surface $15a_1$ of the mPD 15a even when the mPD 15a deviates from the designed position on the beam splitter 14. Specifically, even when the beam splitter 14 deviates the position thereof from the designed one, or the mPD 15a set on the beam splitter 14 deviates the position thereof from the designed position on the beam splitter 14, the mPD 15a may effectively detect the optical beam to find the focal point of the optical beam $B_{2a}$ on the beam splitter 14.

Steps $S_{11}$ to $S_{17}$ align and fix the second lens 16a on the designed position of the intermediate assembly 1. Subsequent to step $S_{10}$, the lens holder 25a holds the second lens 16a and roughly sets it on the designed position thereof on the substrate 1a at step $S_{11}$. One of LDs 12a is practically activated at step $S_{12}$ and the positioner 25 moves the second lens 16a on the fifth reference plane $P_5$ as monitoring the optical beam $B_8$ by the image detector 22 such that the two-dimensional image detected by the image detector 22 has the intensity maximum in the center thereof and the preset size, which is substantially same as those for aligning the first lens 13a on the seventh reference plane $P_7$. The position on the fifth reference plane $P_5$ for the second lens 16a is a position at which the monitored intensity of the optical beam $B_8$ becomes the maximum. The controller 24 manipulates the lens holder 25a through the positioner 25 based on the intensity profile detected by the image detector 22. The image detector 22 in the axis thereof deviates from the axis of the second lens 16a to be aligned by a preset offset because the optical multiplexer 17 shifts the optical axes of the optical beams input therein. Because the second lens 16a is the collimating lens while the lens 27a is the concentrating lens, the deviation of the second lens 16a from the designed position is reflected in the asymmetry of the image profile.

Figure 10:
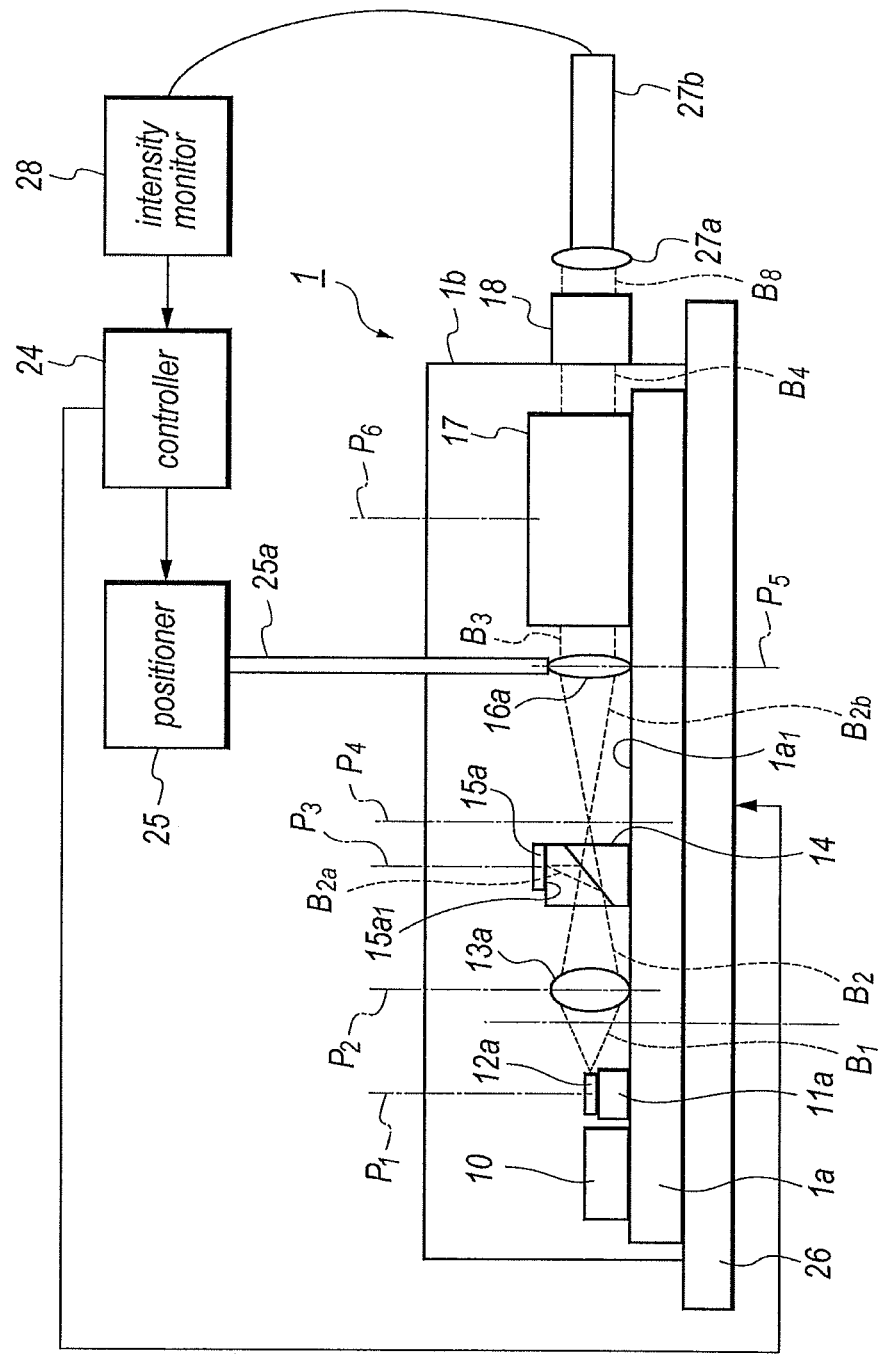
FIG. 10 schematically shows a process to assemble the second lens.

Subsequently, an auxiliary component with an optical fiber 27b assembled with a concentrating lens 27a is replaced from the image detector 22, and the optical output extracted from the optical fiber 27b is detected by the intensity monitor 28, as shown in FIG. 10. The auxiliary component is first aligned with the optical beam $B_8$ output from the output port 18 of the housing 1b such that the intensity concentrated by the lens 27a becomes the maximum. Concurrently with the alignment of the auxiliary component, the second lens 16a is further precisely aligned along the optical axis thereof to obtain the maximum intensity by the intensity monitor 28. The positions of the auxiliary component with respect to the optical multiplexer 17, or the output port 18 of the housing 1b, are memorized for the later use.

Then, the second lens 16a is fixed on the fifth reference plane $P_5$ on the substrate 1a at steps $S_{14}$ to $S_{17}$. Step $S_{14}$ slightly lifts up the second lens 16a from the aligned position defined through steps $S_{11}$ to $S_{13}$; then, an adhesive resin is applied on the substrate 1a; step $S_{16}$ loads the second lens 16a down to the defined position; and step $S_{17}$ cures the adhesive resin. The adhesive resin used for the second lens 16a may be same or similar to that used in the aforementioned steps for the first lens. Specifically, the adhesive resin is the type of the ultraviolet curable resin and/or the thermo-curable resin. Solidifying the former one may be carried out by irradiating with ultraviolet rays, while by heating for the latter one. Thus, the solidified resin $J_2$ for fixing the second lens 16a is formed.

Steps $S_1$ to $S_{10}$ align other first lenses, 13b to 13d, with respective LDs, 12b to 12d, and steps $S_{11}$ to $S_{17}$ align and fix other second lenses, 16b to 16d. However, the steps to position the auxiliary component against the housing 1b are replaceable to the process to position the auxiliary component in the memorized positions. Thus, the first lenses, 13a to 13d, and the second lenses, 16a to 16d, are optically aligned with respective LDs, 12a to 12d.

While there has been illustrated and described what are presently considered to be example embodiments, it will be understood by those skilled in the art that various other modifications may be made, and equivalents may be substituted, without departing from the true scope of the invention. Additionally, many modifications may be made to adapt a particular situation to the teachings of the present invention without departing from the central inventive concept described herein. Therefore, it is intended that the present invention not be limited to the particular embodiments disclosed, but that the invention include all embodiments falling within the scope of the appended claims.

What is claimed is:

1. A method of assembling a transmitter optical module that includes a semiconductor laser diode (LD), a substrate that mounts the LD thereon, and a housing that installs the substrate and the LD therein, the method comprising steps of:
   (a) extracting an optical beam output from the LD to an outside of the housing by using a supplementary jig that displaces the optical beam in parallel to an optical axis of the LD;
   (b) aligning a first lens as monitoring the optical beam in a position such that the first lens has an optical axis coinciding with an optical axis of the LD and the optical beam output from the supplementary jig becomes substantially in parallel to the optical beam output from the LD and a collimated beam; and
   (c) moving the first lens as monitoring the optical beam in another position such that a distance from the LD to the first lens is longer than a focal point of the first lens.

2. The method of claim 1,
   wherein the supplementary jig includes two prisms for reflecting the optical beam output from the LD, respectively.

3. The method of claim 1,
   wherein the step (b) of aligning the first lens includes a step of monitoring the optical beam output from the supplementary jig two-dimensionally.

4. The method of claim 3,
   wherein the step (b) of aligning the first lens is carried out such that the two-dimensional image formed by the optical beam output from the first lens has maximum intensity in a substantially center of the two-dimensional image.

5. The method of claim 3,
   wherein the step (b), of aligning the first lens is carried out such that the two-dimensional image formed by the optical beam output from the first lens becomes a predetermined size.

6. The method of claim 1,
   wherein the step (c) of moving the first lens includes a step of sliding the first lens so as to be apart from the LD by a predetermined distance.

7. The method of claim 1,
   further comprising a step of, after the step (c),
   (d) fixing the first lens on the substrate.

8. The method of claim 7,
   wherein the step (d) of fixing the first lens further includes steps of:
   (d-1) lifting the first lens;
   (d-2) applying an adhesive resin on the substrate beneath the lifted first lens;
   (d-3) placing the first lens on the substrate; and
   (d-4) curing the adhesive resin to fix the first lens on the substrate permanently.

9. The method of claim 8,
   wherein the adhesive resin is selected from a group of ultraviolet curable resin and thermo-curable resin.

10. The method of claim 8,
    wherein the transmitter optical module further includes a second lens that collimates the optical beam output from the first lens, a window that passes the optical beam collimated by the second lens, and a third lens that concentrates the optical beam passing through the window on an external fiber;
    wherein the method further includes, after the step of (d-4), steps of:
    (e) aligning the third lens with the window such that the third lens has an optical axis passing a center of the window;
    (f) removing the supplementary jig from the housing; and
    (g) aligning the second lens, as monitoring a two-dimensional image formed by the optical beam passing through the first lens, the second lens, and the third lens such that the optical beam has maximum intensity in a center of the two-dimensional image.

11. The method of claim 10,
    further including a step of, before the step (g) of aligning the second lens and after the step (f) of removing the supplementary jig, activating the LD.

12. The method of claim 1,
    wherein the transmitter optical module further includes a beam splitter that splits the optical beam is output from the LD and passing the first lens, into two beams, one of the split beams being transmitted through the beam splitter, a rest of the split beams being reflected by the beam splitter, and
    wherein the one of the split beams transmitting through the beam splitter has an axis making an acute angle with respect to an axis of the rest of the split beams reflected by the beam splitter.

13. The method of claim 12,
    wherein the one of the split beams transmitted through the beam splitter has an axis that substantially coincides with an axis of the optical beam entering the beam splitter.

14. The method of claim 12,
    wherein the transmitter optical module further includes a monitor photodiode mounted on the beam splitter, and
    wherein the method further includes a step of aligning the monitor photodiode on the beam splitter with the axis of the rest of the split beams reflected by the beam splitter.

* * * * *